US009298646B2

(12) United States Patent
Vilmos et al.

(10) Patent No.: US 9,298,646 B2
(45) Date of Patent: Mar. 29, 2016

(54) PROCEDURE FOR THE PREPARATION AND PERFORMING OF A POST ISSUANCE PROCESS ON A SECURE ELEMENT

(71) Applicants: Andras Vilmos, Budapest (HU); Peter Parkanyi, Budapest (HU)

(72) Inventors: Andras Vilmos, Budapest (HU); Peter Parkanyi, Budapest (HU)

( * ) Notice: Subject to any disclaimer, the term of this patent is extended or adjusted under 35 U.S.C. 154(b) by 0 days.

(21) Appl. No.: 13/654,060

(22) Filed: Oct. 17, 2012

(65) Prior Publication Data
US 2013/0042325 A1 Feb. 14, 2013

Related U.S. Application Data

(63) Continuation-in-part of application No. 12/799,133, filed on Apr. 19, 2010, now abandoned, which is a continuation-in-part of application No. PCT/HU2008/000114, filed on Oct. 6, 2008.

(30) Foreign Application Priority Data

Oct. 20, 2007 (HU) .................................... 0700685

(51) Int. Cl.
G06F 21/00 (2013.01)
H04L 29/06 (2006.01)
G06F 12/14 (2006.01)

(52) U.S. Cl.
CPC ........ *G06F 12/1408* (2013.01); *G06F 12/1416* (2013.01); *H04L 63/20* (2013.01)

(58) Field of Classification Search
CPC . G06F 12/1408; G06F 12/1416; G06F 21/00; G06F 2221/2153; G06F 17/30011; H04M 1/72569; H04L 63/20
See application file for complete search history.

(56) References Cited

U.S. PATENT DOCUMENTS 6,591,098 B1 * 7/2003 Shieh et al. .................... 455/419
6,719,634 B2 * 4/2004 Mishina et al. ................. 463/42
(Continued)

FOREIGN PATENT DOCUMENTS

EP   1 069 539 A2   1/2001

OTHER PUBLICATIONS

Sun Microsystems, "Java Card Applet Developer's Guide", Jul. 17, 1998, 62 pages.*

(Continued)

*Primary Examiner* — Michael Pyzocha
(74) *Attorney, Agent, or Firm* — Brinks Gilson & Lione

(57) ABSTRACT

The invention relates to a method for enabling post issuance operation on a secure element connectable to a communication device. The method allows an SE controlling party to perform remotely operations such as creation of new security domains for an external party, loading, and installation of applications of an external party and management functions including personalization and activation of applications loaded on the SE for an external party. The method includes the steps of:
collecting data stored on the SE suitable for identification of the SE and data for contacting the SE controlling party;
creating an initial data packet from the collected data,
sending the data packet to a party which can be the external party, an agent of the external party, the SE controlling party, an agent of the SE controlling party.
The invention further relates to a communication device and a software application for implementing the method.

62 Claims, 6 Drawing Sheets

(56) References Cited

U.S. PATENT DOCUMENTS

| | | | |
|---|---|---|---|
| 6,931,379 B1* | 8/2005 | Sato et al. ................... 705/50 |
| 7,266,371 B1* | 9/2007 | Amin et al. .................. 455/419 |
| 8,549,110 B2* | 10/2013 | Jerbi et al. .................. 709/219 |
| 2002/0050528 A1* | 5/2002 | Everett et al. ................ 235/492 |
| 2002/0053090 A1 | 5/2002 | Okayama et al. |
| 2003/0067909 A1* | 4/2003 | Jerbi ................. H04L 29/12301 370/352 |
| 2003/0114192 A1* | 6/2003 | Estes ................. H04M 1/72522 455/558 |
| 2003/0119482 A1* | 6/2003 | Girard ........................ 455/411 |
| 2003/0140252 A1* | 7/2003 | Lafon et al. .................. 713/201 |
| 2003/0181197 A1* | 9/2003 | Larsson ................. H04M 3/42 455/414.1 |
| 2003/0186723 A1* | 10/2003 | Kim ................. H04W 8/183 455/558 |
| 2004/0204117 A1* | 10/2004 | Weiner ............ H04M 1/274516 455/564 |
| 2005/0164737 A1* | 7/2005 | Brown ........................ 455/558 |
| 2005/0182710 A1* | 8/2005 | Andersson ......... G06Q 20/0425 705/39 |
| 2005/0239504 A1* | 10/2005 | Ishii et al. .................. 455/558 |
| 2006/0019611 A1* | 1/2006 | Mages ........................ 455/73 |
| 2007/0124809 A1* | 5/2007 | Narin et al. .................. 726/6 |
| 2008/0003980 A1* | 1/2008 | Voss et al. .................. 455/411 |
| 2008/0062900 A1* | 3/2008 | Rao ........................ 370/310 |
| 2008/0113687 A1* | 5/2008 | Prendergast et al. ......... 455/558 |
| 2008/0116264 A1* | 5/2008 | Hammad et al. ............ 235/382 |
| 2008/0268866 A1* | 10/2008 | Sukkarie ................... 455/456.1 |
| 2009/0215431 A1* | 8/2009 | Koraichi .................... 455/411 |
| 2012/0215694 A1* | 8/2012 | Vilmos ...................... 705/44 |

OTHER PUBLICATIONS

International Preliminary Report on Patentability for International Application No. PCT/HU2008/000114 dated Jan. 13, 2010.

* cited by examiner

PROCEDURE FOR THE PREPARATION AND PERFORMING OF A POST ISSUANCE PROCESS ON A SECURE ELEMENT

CROSS REFERENCE TO RELATED APPLICATION

This application is a continuation-in-part of U.S. patent application Ser. No. 12/799,133 filed on Apr. 19, 2010 which, in turn, is a continuation-in-part of PCT/HU2008/000114 filed on 6 Oct. 2008 and claims priority of Hungarian Patent Application No. P0700685 filed on 20 Oct. 2007.

FIELD OF INVENTION

The present invention relates to a method for enabling post issuance operation on a secure element (SE) connectable to a communication device by a party controlling the SE. In a first aspect of the invention the method is performed by the communication device or a software application running on the communication device. In a second aspect the method is performed by an external party such as a service provider.

The invention further relates to a communication device which is connectable to a secure element and a software application that can be installed on such a communication device.

In the context of the present invention the terms "secure element" or "SE" mean a secure storage part-unit, such as a chip card, e.g. the SIM cards used in mobile handsets, or a smart card inserted into a PC, or terminal as well as a special software application as part of the operating system of the device.

BACKGROUND OF INVENTION

As a result of the development of communication devices, and secure elements especially in mobile telephone sets, handheld computers as well as chip-cards, an increasing number and wide range of services have become available for users on the new generation of communication devices. Some of the available services are pre-installed on the communication device or on the secure element in it, but information contents realizing other services also exist which may need to be or are preferably downloaded later on to the user's communication device based on the choice of the user. Frequently due to security considerations, sensitive information content or part of the information content should preferably be downloaded onto the secure element of the communication device, i.e. to a protected storage unit.

However, according to the present state of the art in general, the entire storage area of the secure element suitable for receiving such information content is linked to a single entity, to the secure element issuer (SE issuer) itself, and is essentially exclusively used by this entity. This circumstance is disadvantageous for both the service providers wishing to offer new services via new applications and for the users of the communication devices. The current situation also prevents the SE issuer to economically utilize the available capacity of the secure element. In most cases the capacity and potentials of the secure element are not exploited to their full extent. The secure element placed in the communication device includes, in general, a unified storage area, or even if part areas separated from each other exist, they are not utilized by multiple services, service providers or applications. The secure elements are pre-personalized and personalized quasi during the chip-card manufacturing process, and after this is completed neither the secure element issuer, who in most cases is also the service provider, nor the user is able to reconfigure the content of the secure element. This practice may cause much of the card capacity, and certain storage part areas to be unused, as at the time of production, or before the issuance of the secure element it is not possible to know the real commercial demands relating to the existing and future services. Hence, some unnecessary applications may be pre-loaded and pre-installed on the card, while other services that would actually be required by the users may be left out.

US 2002/053090 discloses a data receiving apparatus having a storage unit wherein an exclusive memory area can be secured for a service provider, such as a broadcasting provider. However, the exclusive memory area is secured (or deleted) by a program operating on the data receiving apparatus. Because the exclusive memory area is managed locally and there is no external controlling/managing party, the exclusive memory area is more prone to tampering, which renders it unsuitable for use in combination with services where high security is required. Also if the storage capacity management is performed off-line without the involvement of the secure element issuer/owner there is no possibility for the commercialization of the available storage space, the financial incentives are missing.

SUMMARY OF INVENTION

The objective of the present invention avoids the unfavorable pre-installation practice during the traditional issuance process of the secure elements, and enables dynamic post issuance operations (procedures), even between previously unknown parties in an ad-hoc manner, utilizing the potential provided by mobile or stationary (terminal) communication devices. Such post issuance operations are understood to comprise creation of new security domains (uniquely accessible storage areas), loading and installation of applications as well as other types of management functions, such as personalization and activation of the applications loaded on the secure element.

More specifically, it is an object of the invention to allow for the dynamic creation of security domains serving to receive various information content, and to also allow for the deployment of information and applications belonging the various service providers onto the secure element after the card has been manufactured and put into distribution, and in such a way that selected information stored on the secure element, and collected by the communication device, or an application running on the communication device the secure element is attached to, is used for the facilitation of the overall remote post issuance procedure, by sending this information by the communication device to either the owner-issuer (the service provider or its supporting party) of the application/data that needs to be loaded onto the secure element, or directly to the controlling party of the secure element and letting them process this information according to the methodology described. The recognition that led to the procedure according to the invention was that if some type of secure element identification and the direct or indirect (e.g. searchable in a database) contact information of the SE controlling party (SE issuer or its agent, service manager) is provided in a determined data group of the secure element, and this data is queried by the communication device or an application running on it, then by sending this information, and also potentially other data elements related to the secure element, the communication device and/or running environment and/or user and/or content, to the owner-issuer of the application, which needs to be loaded onto the secure element, or directly to the controlling party of the secure element the dynamic post issuance operations (such as setting up of security domains and authorizing access to the security domain for a determined party, e.g. service provider, or the loading, personalization and activation of the application) can be realized on the secure element even after the pre-personalization and initial personalization of the chip card (secure element) and its delivery to the user.

The inventors have also realized that with the unique utilization of suitably selected data elements stored on the secure element and by creating data packets therefrom and forwarding the data packets by the communication device in accordance with the procedure of the invention it is possible to effect the post issuance operations on a secure element over the air, i.e. via a remote communication connection in such a way that even previously unknown parties—secure element controllers, and service providers—can start working together to realize the post issuance procedure on the user's secure element and can load remotely the required application onto the secure element.

Over the air (OTA) techniques are readily available as well as providers allowing for performing post issuance (including personalization) procedures remotely. OTA is a service but it is also a common name for various known communication technologies that enable secure data transfer between an SE and a back-office architecture. From the perspective of the present invention the technical implementation of OTA services is transparent and does not affect the main concept of the invention.

In accordance with the above objectives the invention provides a method for enabling a post issuance operation on a secure element (SE) controlled by a SE controlling party, which SE is connectable to a communication device, comprising the steps of:
  collecting from the SE data suitable for the identification of the SE and data for contacting the SE controlling party;
  creating with the communication device a data packet containing at least the collected data; and
  electronically sending the data packet to a party selected from a group consisting of an external party, an agent of the external party, and the SE controlling party.

In this aspect of the invention the communication device, or a software application running on the communication device, performs the above method that enables the post issuance operation. The post issuance operation is carried out on the secure element remotely by the SE controlling party. This may include the creation of new security domains for an external party (such as a service provider), loading, and installation of applications of an external party and management functions including personalization and activation of applications loaded on the secure element for an external party.

The invention further relates to a method for preparing post issuance operation on a secure element (SE) controlled by a SE controlling party to a communication device, which method comprises the steps of:
  receiving an initial data packet from the communication device to which the SE is connected, the data packet comprising data suitable for identification of the SE and data for contacting the SE controlling party,
  processing the initial data packet received from the communication device, including determining from the initial data packet contact information of the SE controlling party,
  creating from the initial data packet a post issuance operation request data packet comprising data suitable for the identification of the SE and comprising information relating to a requested post issuance operation, and
  sending the post issuance operation request data packet to an address defined by the contact data of the SE controlling party.

In this aspect of the invention the method for enabling the post issuance operation is performed by an external party such as a service provider requesting the post issuance operation. The post issuance operation is carried out on the secure element remotely by the SE controlling party, this may include the creation of new security domains for an external party, loading, and installation of applications of an external party and management functions including personalization and activation of applications loaded on the secure element for an external party.

The invention further relates to a method for enabling a post issuance operation on a secure element (SE) controlled by a SE controlling party comprising allowing determination of the SE controlling party by:
  storing on the SE direct or indirect contact information of the SE controlling party.
  allowing retrieval of the direct or indirect contact information for contacting the SE controlling party.

The invention further relates to a communication device for reading a secure element (SE), programmed to:
  collecting data stored on the SE comprising data suitable for identification of the SE and data for contacting a controlling party of the SE,
  create a data packet comprising at least the collected data, and
  send the data packet to an addressee chosen from a group consisting of an external party, an agent of the external party and the party controlling the SE.

The invention further relates to a software application configured for installation on a communication device connectable to a secure element (SE) and adapted for:
  collecting from the SE data suitable for identification of the SE and data for contacting an SE controlling party,
  creating a data packet comprising at least the collected data, and
  sending the data packet to an addressee chosen from the group consisting of an external party, an agent of the external party, and the SE controlling party.

Sending the data packet is understood to include the possibility of forwarding the data packet to a further program installed on the communication device and/or to a hardware device which is responsible for the transmission of the data packet. Moreover, any number of hardware and related software as well as further parties may participate in carrying out the actual transmission.

Further advantageous embodiments of the invention are defined in the attached dependent claims.

The objective was furthermore to elaborate a procedure for the service providers which ensures that the information received from the communication device that is connected to the secure element can be used to initiate communication with the controlling party of the secure element and the establishment of the new security domain, or the loading of the application can be requested in an ad hoc manner in a quasi real time procedure. One of the most important advantages of the procedures according to the invention is to provide a possibility to subsequently reconfigure the application portfolio stored on the secure element remotely and even repeatedly whereby even independent security domains (storage areas) may be created and applications may be loaded in such a way that the required data exchange between partners that are unknown to one another becomes possible in a simple automated manner.

An advantage deriving from this is that an entire secure element becomes usable by completely independent content service providers, and the information content—even without the direct physical connection between the participants—is in all cases downloadable to a security domain that is uniquely accessible, i.e. inaccessible to other parties. Thus the use of the secure element can be optimized allowing the user to access and use several different applications even new applications available only after the original issuance of the secure element and applications can also be stored on the secure element even temporarily for a limited period of time, only as long as they are needed.

It is important to see that post issuance personalization of a secure element has already been possible even prior the present invention based on various Global Platform specifications. But all these specifications are missing the points of how to initiate the post issuance procedure between previously unknown parties in such a way that can lead to a convenient, automated procedure. The present invention solves this problem, because it identifies certain data elements to be placed on the secure element, and a communication device to collect and communicate this information and a processing methodology of the communicated information which combined makes it possible to establish the initial communication between even previously unknown parties, a secure element issuer and a service provider, that can lead to the successful realization of a fully automated post issuance procedure on a secure element attached to a communication device.

BRIEF DESCRIPTION OF THE DRAWINGS

In the following the set of equipment used for the procedure according to the invention is presented in more detail on the basis of exemplary embodiments and drawings. In the drawings.

DETAILED DESCRIPTION OF PREFERRED EMBODIMENTS

Figure 1:
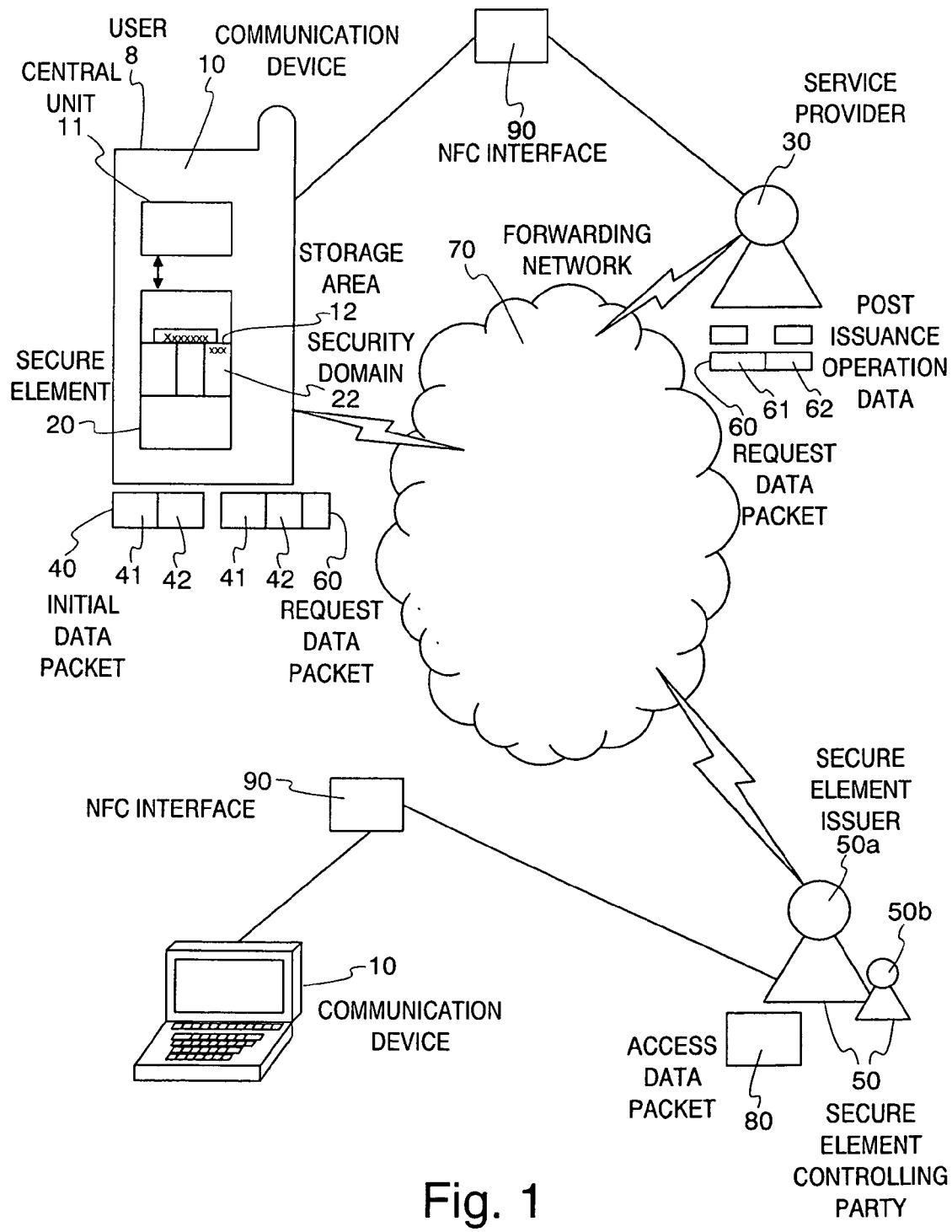
FIG. 1 shows the block diagram of a possible embodiment of the set of equipment used during the procedure.

FIG. 1 schematically depicts a possible set of devices with the help of which the procedure according to the invention may be realized. A user 8 may be equipped with various types of communication devices 10 of which two exemplary embodiments can be seen, one of them being a mobile telephone set (handset), while the other one is a portable minicomputer. However, the term communication device should be interpreted in a broad sense; any apparatus suitable for performing the essential functions of the exemplified embodiment of the communication device 10 disclosed in the present specification is understood to be a communication device in accordance with the invention. For example any card terminal is also included that is capable of performing the functions required of the communication device according to the invention, e.g.: reading specific information from the secure element, creating data packets including the captured information and sending the data packets to specified addresses using any type of communication channel.

The individual communication devices 10 may be connected to external parties, which are in the present example a service provider 30 and/or its agent 30a (see FIG. 2), as well as being connected to a SE controlling party 50 by an information forwarding network 70 (such as the Internet or a mobile communication network). In the context of the present invention the external party is the party for whom a new security domain is created, or whose application or data is loaded, or installed on the SE, or on the behalf of whom other management functions, such as personalization and activation of applications loaded on the secure element is performed.

The SE controlling party may be an SE issuer 50a and/or its agent 50b, (e.g. a Trusted Service Manager) assisting the interactions of the SE issuer 50 and other parties to perform such activities that in the traditional pre-personalized, static, single application environment would not be necessary and therefore the SE issuer may not be capable of. These tasks are related to the post issuance, multi application management functions like the approval of loading request, allocation of card storage capacity and the initiation and realization of the actual application installation process, including the necessary administrative and security procedures like key management. For the sake of simplicity, when distinction is not important, we will call both the SE issuer 50a and its agent 50b universally the SE controlling party. The SE controlling party term also includes the entity who manages a specific subdomain of the card independently of the SE issuer. This entity performs in practice the same or similar processes as the SE issuer does on a generic Global Platform card.

The service provider 30 and the SE controlling party 50 are understood to include the information technology infrastructure required for performing the various steps of the procedure according to the invention. Such infrastructure typically includes computer servers.

Figure 2:
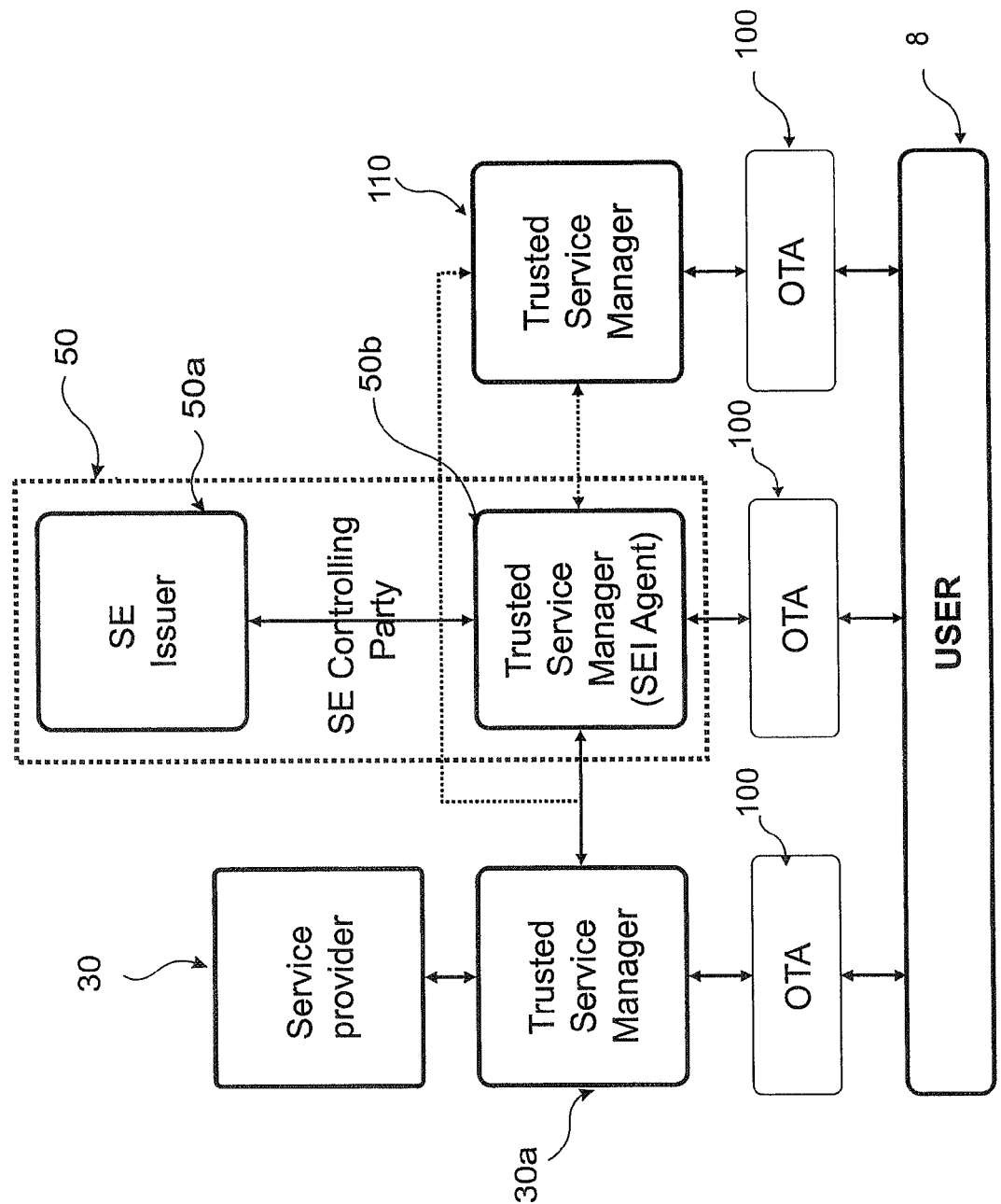
FIG. 2 shows the block diagram of the participating parties of an exemplary embodiment of the procedure according to the invention.

A plurality of other entities may also be involved in the interactions of the communication device 10 of the user 8, the service provider 30 and the SE controlling party 50 as illustrated in FIG. 2, such as one or more OTA providers 100 providing OTA (over the air) services, or one or more trusted service managers (TSM) 110, i.e. a trusted third party, who can provide the technology and service support necessary for realizing certain new types of services, for which service providers 30 and/or users 8 may not be technically ready. For example the service provider's agent 30a can be a TSM 110 that may perform the remote application management for the service provider 30 while the user's TSM 110 may provide certain types of customer support functions for the user. Both the user 8 and the service provider 30 may employ a separate TSM 110 or the same TSM 110 may be acting for the different parties. It is also possible that the secure element issuer's 50a'agent 50b is a TSM (being the actual SE controlling party 50) is the same entity which provides technical support for the service provider 30 as well as for the users 8.

As an alternative to the information forwarding network 70 the service provider 30 may be provided with a special interface 90 via which it is possible to directly communicate with communication device 10. For example the communication device 10 may be an NFC-enabled (near field communication enabled) mobile handset capable of communication with an NFC interface 90.

The exemplary mobile telephone set serving as the communication device 10 comprises a central unit 11, which controls the operation of the communication device 10, and a secure element 20 (typically in the form of some type of a chip card, which can be fixed or removable, or software application, TEE) which is connected to the central unit 11, and, furthermore, another storage area 12 of the communication device 10. The secure element 20 contains at least one, but potentially more security domains 22 some of which are to be created according to the present procedure or in which the applications can be loaded into using the present procedure.

An initial data packet 40 or a post issuance operation request data packet 60 is also associated with the communication device 10, which contains SE data 41 stored in the secure element 20 and optionally supplementary data 42 which may comprise data stored in the storage area 12 of the communication device 10. The SE data 41 and the supplementary data 42 are data that may be forwarded either via the information forwarding network 70 or via the interface 90 to the service provider 30 or to the SE controlling party 50.

The SE data 41 comprises data suitable for the identification of the secure element 20 by the SE controlling party 50 in order to be able to carry out post issuance operations on the specific secure element 20. Preferably the SE data 41 also comprises the secure element's 20 CPLC (Card Production Life Cycle, see: e.g. EMV-CPS-1.0) information and/or the Card Recognition Data in order to evaluate the security environment and other details of the secure element 20. The SE data further comprises data for contacting the SE controlling party 50 (e.g. an automated contact information of the SE controlling party 50). The direct contact information of the SE controlling party 50 may contain data such as its information network identifier (e.g. URL or IP address) or any other type of unique identification means that can also be processed electronically.

It should be noted that the identification of the SE controlling party 50 need not necessarily be carried out directly. The SE data 41 may contain the indirect contact information of the SE controlling party 50, whereby the SE controlling party 50 is only represented by a so-called "pointer", which, for example, points to a given element of a remotely accessible computer database, and this element contains the real direct contact details of the SE controlling party 50.

Furthermore, the SE data 41 may also contain character series identifying the registered user of the secure element 20 (e.g. user name).

The supplementary data 42 preferably comprises data stored in the normal storage area 12 of the communication device 10 (e.g. in the telephone memory of a mobile handset) and may include information suitable for the identification and technical description of the communication device 10 (e.g. serial number, IMEI, telephone number of a mobile handset, etc.) in order to allow the service provider 30 to establish whether the communication device 10 meets the technical requirements of the requested service application and the service provider 30. The supplementary data 42 may also include data inputted by the user of the communication device 10 e.g. for the manual definition of the requested post issuance operation. The supplementary data 42 may also include data received from the service provider 30, including e.g. the technical details or other information of the requested post issuance operation such as the required size of a security domain 22 to be created for the service provider 30. Optionally any such data can be included directly by the service provider in case an initial data packet 40 is created from the supplementary data 42 and the SE data 41 which is then sent to the service provider 30 as will be explained in connection with the examples. In the following the procedures according to the invention are presented in more detail through examples.

Example 1

Figure 3:
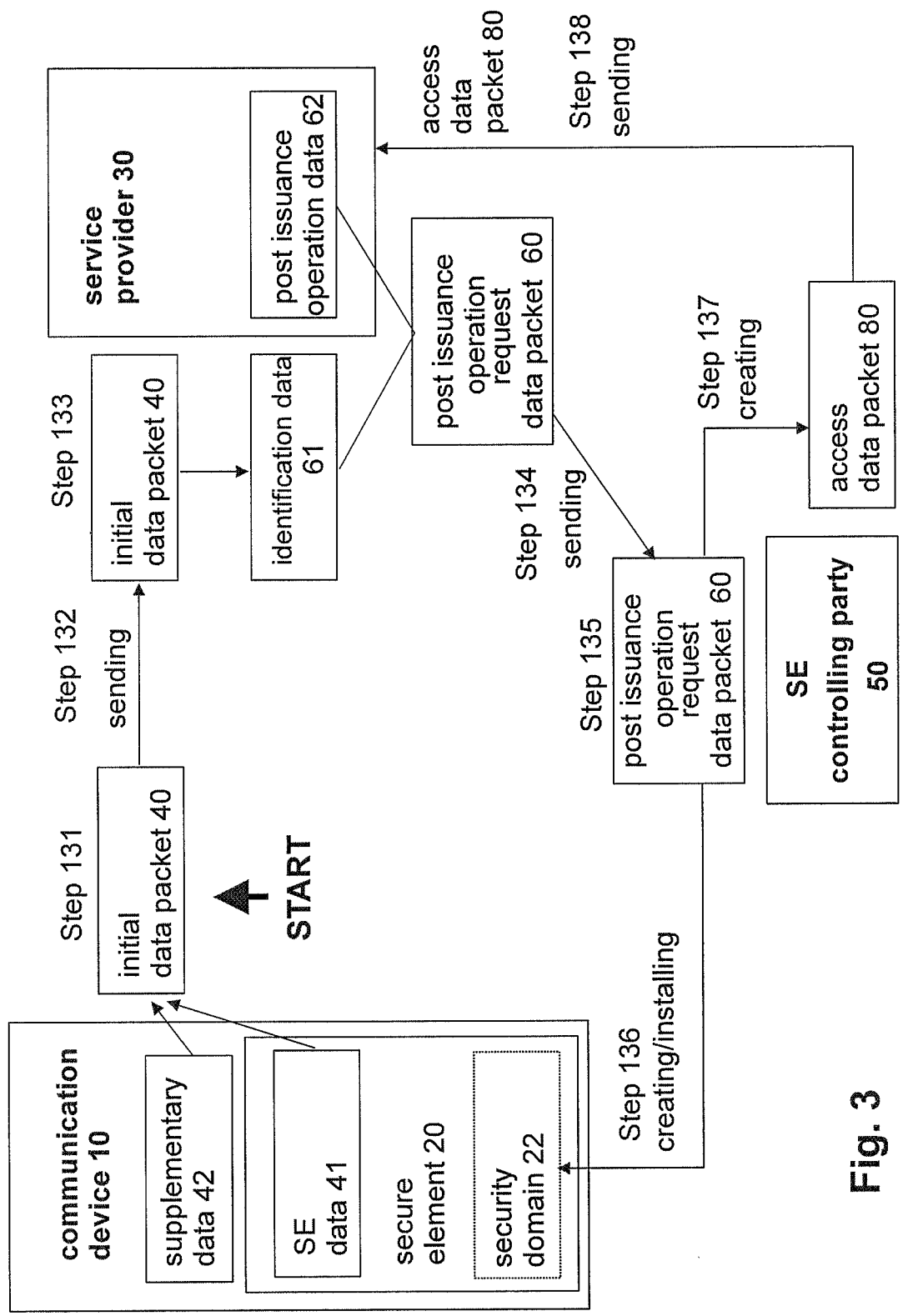
FIG. 3 is a block diagram of an advantageous embodiment of the inventive procedure.

In this embodiment of the procedure according to the invention the goal was to create a security domain 22 in a secure element 20 of a communication device 20 in order to receive information content (e.g. a ticketing application). The steps of the procedure are schematically illustrated in FIG. 3.

An initial data packet 40 was created in Step 131 (FIG. 3) by a data collecting application installed on the communication device 10. The data packet 40 included the SE data 41 which contained information suitable for the identification of the secure element 20 (e.g. the serial number of the secure element 20) and direct contact information of the SE controlling party 50 (e.g. the secure element issuer). The supplementary data 42 of the data packet 40 contained identification data of the communication device 10 (e.g. type of the device) for identifying the technical capacity of the device 10. The supplementary data 42 preferably includes information relating to the requested post issuance operation, e.g. data identifying the type of post issuance operation requested (e.g. in the present case the creation of a security domain 22) and data identifying the purpose of the post issuance operation e.g. data identifying the request of the user 8 as to what kind of service application should be installed on the secure element 20 of the communication device 10 which may allow for the determination of the technical requirements of the security domain 22. Optionally this information may be provided inherently by sending the initial data packet 40 to a specific address corresponding to the distribution of the required service, the ticketing application in the present example.

The function of this initial data packet 40 which is created by a pre-installed data collecting software application (a HOST program) of the communication device 10 is to make it clearly determinable during the inventive procedure in which secure element 20 the security domain 22 is to be created on, or on which secure element 20 should the requested loading/installation/personalization/activation of an application take place, and who or which SE controlling party 50 is able to perform this. The pre-installed software application may be installed by the manufacturer or the user 8 may download it and install it subsequently. The data collecting software application may also be provided by the service provider 30 in which case the address to which the initial data packet 40 is to be sent may be included in the data collecting application, alternatively the application may be provided by the controlling party 50 of the secure element 20, in which case the application itself may already contain relevant information in respect of the SE controlling party 50 and only the information relevant for the secure element needs to be collected. The data collecting software application dynamically collects all the required data and creates the initial data packet 40. Collecting of the data may be performed automatically each time the communication device 10 is switched on, or only upon launching the data collecting software application. The data collecting software application may obtain data from both the normal storage area 12 of the communication device 10 and the secure element 20 as well as through any user input interface of the communication device 10, such as keyboard, touch screen, etc.

After the initial data packet 40 had been created using the communication device 10 (and more specifically by the data collecting application), in Step 132 it was sent to the service provider 30 operating a ticketing application through the information forwarding network 70. After receiving the initial data packet 40 at the service provider 30 the SE data 41 and the supplementary data 42 were processed in Step 133, whereby the application corresponding to the request of the user 8, the communication device 10 of the user 8 and the secure element 20 thereof were identified, furthermore, the contact information of the SE controlling party 50 controlling the secure element 20 was also determined.

Following this the service provider's 30 post issuance operation request data packet 60 was set up by the service provider 30, which included identification data 61 and optionally post issuance operation data 62. The identification data 61 was based on the initial data packet 40 received from the communication device 10 and contained data identifying the secure element 20 and the communication device 10 containing the secure element 20. The identification data 61 preferably further includes information identifying the service provider 30 and its application which information is either added by the service provider 30 or was already included in the supplementary data 42 of the initial data packet 40 e.g. based on data inputted by the user 8 or data received earlier from the service provider 30. Hence, some or all the data comprised in the identification data 61 may be data extracted from the initial data packet 40 or it may simply correspond to the initial data packet 40 which is then forwarded as part of the post issuance operation request data packet 60 to the SE controlling party 50 using the contact information of the SE controlling party 50 and typically through the information forwarding network 70.

The optional post issuance operation data 62 may comprise information relating to the requested post issuance operation, such as information identifying the type of post issuance operation (e.g. creating a security domain 22 or uploading/installing a certain application on the SE, etc.) and information identifying the technical parameters of the post issuance operation (e.g. the size of the application to be loaded and its technical parameters).

In Step 134 the post issuance operation request data packet 60 was sent to the SE controlling party 50 (the SE issuer 50a or its agent 50b) where it was processed in Step 135 in order to identify the necessary data for carrying out the post issuance process. The secure element 20 on which the security domain 22 had to be made as well as the communication device 10 containing it was identified from the position request data 60 and more specifically from the identification data 61. Following this, in Step 136 the required security domain 22 was created by the SE controlling party 50 remotely using OTA technology. This involved sending a group of instructions, according to Global Platform life-cycle management specifications. (See: Global Platform Card Specifications) to the communication device 10 containing the secure element 20 with which the security domain 22 was created.

In Step 137 an access data packet 80 containing the access parameters (e.g. specific keys) authorizing operations on the security domain 22 were created. The access data packet 80 indicates data (group of information) with the use of which the required security domain 22 or uniquely accessible information content loaded on the secure element 20 of the communication device 10 may be accessed. The access data packet 80 is either sent to the service provider 30 directly or it is sent to the communication device 8 from where it is forwarded to the service provider 30. In the present example the access data packet 80 was sent by the SE controlling party 50 to the service provider 30 in Step 138 through the information forwarding network 70. Thus the security domain 22 requested by the service provider 30 and only accessible by the service provider 30 was created in the given secure element 20 of the user's 8 communication device 10.

Example 2

In this embodiment of the procedure according to the invention, as opposed to that presented in the previous example, the contact details of the SE controlling party 50 were determined first by the service provider 30 in Step 133 on the basis of the indirect contact data stored in the secure storage part unit 20 located in the user 8 mobile handset communication device 10.

In order to acquire this data, from the indirect contact information placed in the secure element 20 a determined section of a database was reached from which the direct contact details of the SE issuer appearing as the SE controlling party 50 of the given secure element 20 were acquired. In the possession of this information a post issuance operation request data packet 60 was created from the SE data 41 suitable for identifying the secure element 20 and from the supplementary data 42 identifying technical properties of the communication device 10, furthermore, from the details of the service provider 30 wishing to install a service application onto the requested security domain 22 and of the service application itself.

In this embodiment the post issuance operation request data packet 60 was sent via information forwarding network 70 to the SE controlling party 50 in Step 134, where it was processed in Step 135. Following this, a security domain 22 on the secure element 20 of the communication device 10 in Step 136, and in Step 137 an access data packet 80 was created for the service provider 30 allowing unique access to the security domain 22. The service provider 30 was informed of the creation of the security domain 22 over the information forwarding network 70 in Step 138, and at the same time the access data packet 80 was sent to it. Thus a new security domain 22 has been created on the secure element 20 of the communication device 10 suitable for receiving the information content (e.g. service application) offered by the service provider 30.

Example 3

The present embodiment of the inventive procedure (illustrated in FIG. 3 as well) differs from the embodiment described in Example 1 in that the post issuance process involves loading uniquely accessible data content (application) onto the secure element 20, instead of creating a uniquely accessible security domain 22.

The procedure is very similar, in Step 131 an initial data packet 40 is created at the communication device, which is sent to the service provider 30 in Step 132. In Step 133 the service provider 30 processes the initial data packet 40, determines the SE controlling party 50 (either from direct or indirect contact information included in the initial data packet) and creates a post issuance operation request data packet 60, which comprises certain required data obtained from the initial data packet 40 and information relating to the data content to be loaded on the secure element 20.

The service provider 30 sends the post issuance operation request data packet 60 to the SE controlling party 50 in Step 134. The data content to be uploaded on the secure element 20 may be sent together with or even as part of the position data request 60, or it may be sent separately possibly upon request from the SE manager.

In Step 135 the data packet 60 is processed by the SE controlling party 50. In the present embodiment of the inventive procedure the SE manager does not create a uniquely accessible security domain 22, instead it uploads the required data content, application on the secure element 20 in Step 136. Optionally personalization operations may be carried out by the SE manager as well. Similarly to the previously described procedures the SE manager creates an access data packet 80 for accessing the uniquely accessible data content uploaded on the secure element 20 (Step 136) and sends this data packet 80 to the service provider (Step 137).

Example 4

In this embodiment of the procedure according to the invention a security domain 22 is created in a post issuance process without the active participation of the service provider 30 (or any other external party destined to have access to the security domain 22).

Figure 4:
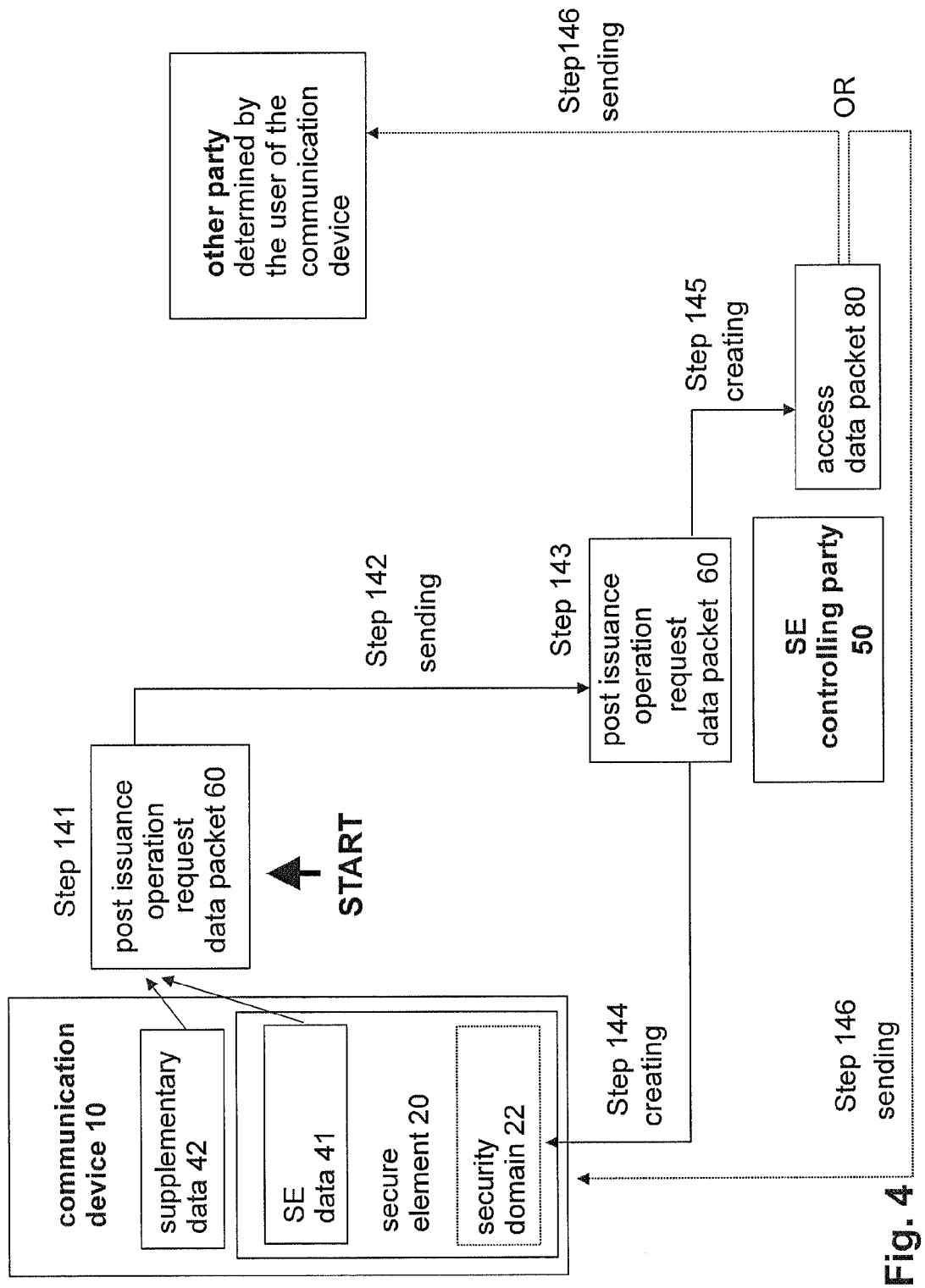
FIG. 4 is a block diagram of another advantageous embodiment of the inventive procedure.

As illustrated in FIG. 4, in Step 141a data packet 60 relating to a post issuance operation request is created at the communication device 10 (possibly with the help of the data collecting application). In the present example the data packet 60 the supplementary data 42 preferably also comprises data relating to the size and optionally other technical requirements of the security domain 22 to be created in the secure element 20, as well as data identifying an external party (typically the service provider 30) destined to have access to the security domain 22. In step 142 this data packet 60 is sent directly to the SE controlling party 50, where it is processed in Step 143 in a similar manner as described in the above examples in connection with the post issuance operation request data packet 60 of the service provider 30.

In Step 144 the uniquely accessible security domain 22 is created and an access data packet 80 is provided in Step 145. In Step 146 the access data packet 80 allowing access to the security domain 22 is sent directly to the designated service provider and/or to the user's communication device 10.

Although the above procedure have been described as a three-party process (in the case of Example 4 as a two-party process) it is clear that further parties may be involved in the interactions of any two main parties (i.e. the user 8, the service provider 30 and the SE controlling party 50). For example OTA service providers 100, certification authorities or TSMs 110 may receive and forward any of the data packets 40, 60, 80 to its destination (i.e. to the user 8, the service provider 30 or the SE controlling party 50).

Example 5

Figure 5A:
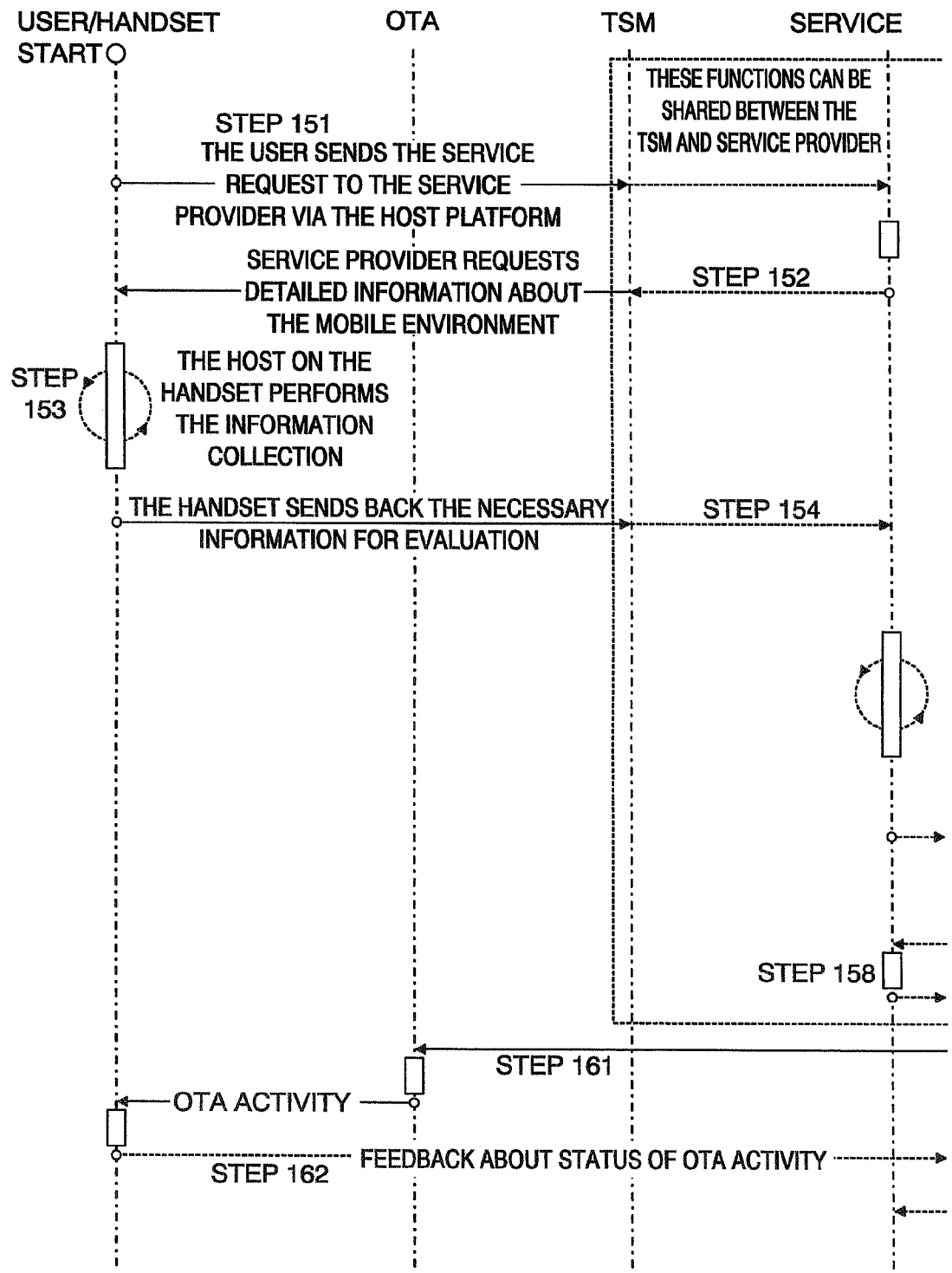
FIGS. 5a and 5b are a schematic diagram of another advantageous embodiment of the inventive procedure.
Figure 5B:
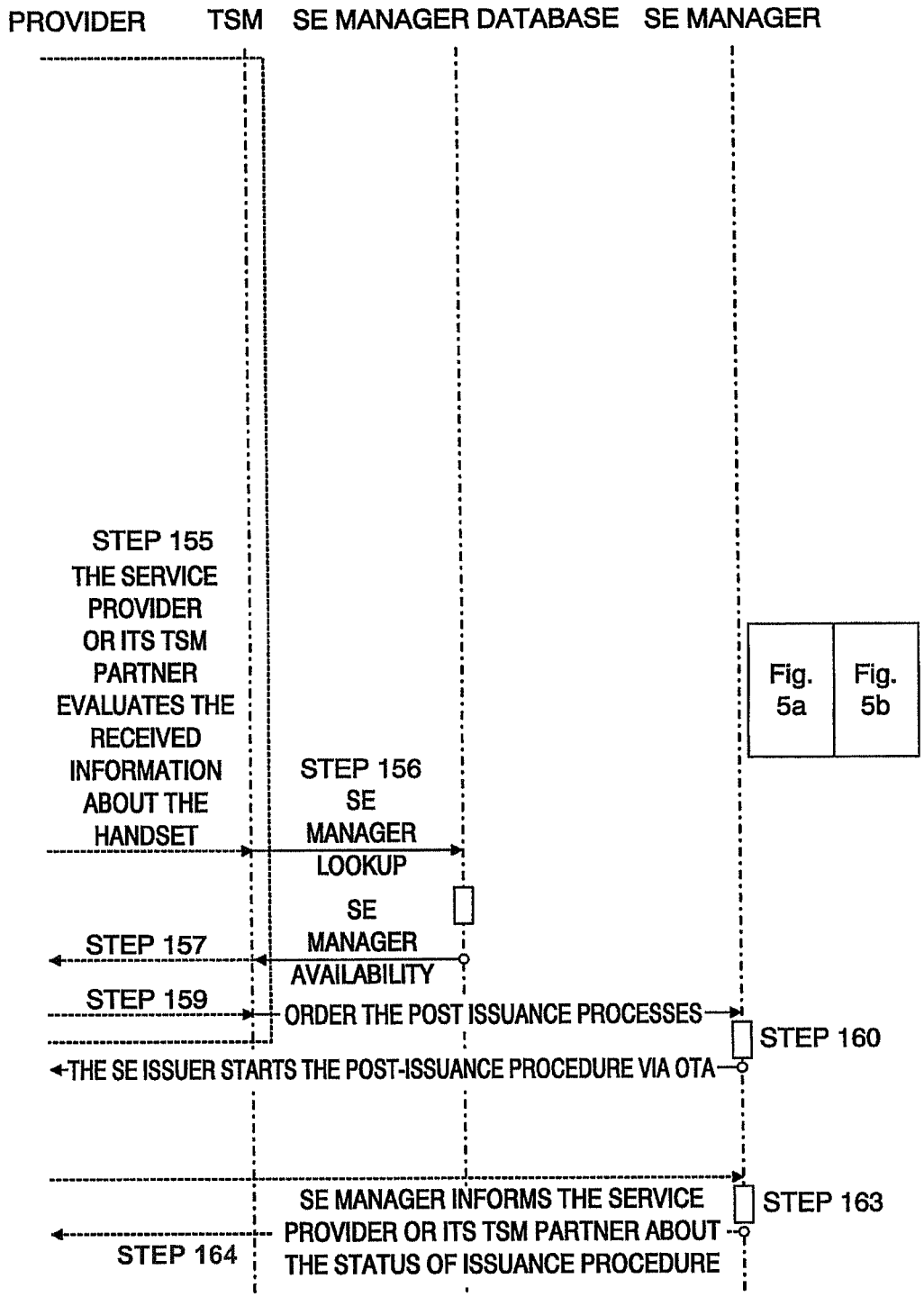

FIG. 5 illustrates a more general exemplary procedure according to the invention wherein further parties such as an OTA provider 100 and a TSM 110 participate as well. In Step 151 of the present example the user 8 sends a service request to the service provider 30 either directly or via the TSM 110 using the communication device 10. After this the service provider sends back an inquiry in Step 152 requesting detailed information about the IT environment (in the present embodiment the communication device 10 is a mobile handset, thus the IT environment corresponds to the mobile environment). A HOST program (e.g. the above described data collecting software application) on the mobile handset 10 performs the information collection in Step 153 and an initial data packet 40 is created based thereon. The handset then transmits back the initial data packet 40 in Step 154 to the service provider 30 or its TSM 110, where the data packet 40 is processed and the information relating to the secure element and the mobile handset 10 is evaluated in Step 155, to see whether the secure element and the handset 10 meets the technical requirements of the offered service (and optionally any other requirements). In the present example the procedure involves looking up the direct contact information of the SE controlling party 50 in a remote database (the SE controlling party database) in Step 156 and obtaining the direct contact information of the SE controlling party 50 therefrom in Step 157. After this in Step 158 the service provider 30 creates the post issuance operation request data packet 60 as explained above, and in Step 159 the positions request data packet 60 is sent to the SE controlling party 50 (possibly via the TSM 110) based on the direct contact information obtained from the SE controlling party database. In Step 160 the SE controlling party processes the positions request data packet 60 determining the secure element 20. Thereafter, in Step 161, the SE manager starts the post issuance process via OTA and with the help of the OTA provider 100 in order to create the security domain 22 in the secure element 20. A feedback about the status of the OTA activity is sent back from the secure element 20 to the SE controlling party 50 in Step 162. The SE controlling party 50 then creates an access data packet 80 in Step 163 allowing unique access to the newly created security domain 22. This access data packet 80, serving as a confirmation response and comprising the specific keys to access the security domain 22, is sent to the service provider 30 in Step 164 either directly or via its TSM 110.

Example 6

In this embodiment of the procedure according to the invention the user has a secure element 20 in the form of a plastic chip card having the same capabilities as described in respect of the secure element 20 within the mobile phone. This chip card contains one or more preloaded applications and stores all the relevant information that is necessary to assemble the data packet identifying the secure element itself and its issuer/owner/controlling party. The user 8 places/touches this card into/to a service terminal operated by a service provider 30 itself or by another third party acting on its behalf. In this scenario the service terminal acts as the communication device 10 being connected either to the service provider 30 or to its agent or directly to a card issuer (an SE issuer). When the user 8 selects the desired functionality of the terminal associated with loading of a new application onto the card, the terminal reads the necessary information from the card—e.g.: its serial number, and the contact information of its controlling party—prepares the initial data packet 40 and forwards this request either to the service provider 30 or to its agent, or directly to the controlling party 50 of the chip card 20. From this point on the process is the same like described in the above detailed examples. If the initial data packet 40 was sent to the service provider or to its agent, it prepares a post issuance operation request data packet 60 and sends it to the controlling party 50 of the secure element 20 (chip card). The SE controlling party 50 establishes communication with the terminal and through the terminal with the secure element 20 connected to it and performs the post issuance life-cycle management procedure requested by the service provider. When the process is completed and either a new security domain 22 is established or the application or simply data is loaded onto the card the SE controlling party 50 sends the access data packet 80 to the service provider 30 which enables the service provider 30 to load and install new applications or to complete the installation process of the new application loaded by the SE controlling party 50. When removing the card 20 from the service terminal the user can use the new application with any applicable card reader device.

The above-described embodiments are intended only as illustrating examples and are not to be considered as limiting the invention. Various modifications will be apparent to a person skilled in the art without departing from the scope of protection determined by the attached claims.

The invention claimed is:

1. A method for enabling a post issuance operation on a secure element (SE) controlled by a SE controlling party, the method comprising:
performing the following in a communication device comprising a secure element (SE), wherein the SE has at least one security domain and is already personalized, the security domain requiring access parameters to perform at least one operation on the security domain, the method comprising:
receiving by the communication device a request to enable the post issuance operation on the SE, the post issuance operation comprising an operation performed on the SE after personalization of the SE;
querying the SE by the communication device for data suitable for the identification of the SE and data for contacting an SE controlling party, the data existing in a determined data group of the SE;
collecting from the SE by the communication device the data suitable for the identification of the SE and the data for contacting the SE controlling party;
creating by the communication device a data packet containing at least the collected data suitable for the identification of the SE and the collected data for contacting the SE controlling party; and
electronically sending by the communication device the data packet via a remote communication channel to a party selected from a group consisting of an external party and an agent of the external party.

2. The method according to claim 1, wherein the external party's agent is a trusted service manager.

3. The method according to claim 1, wherein the step of creating the data packet by the communication device also includes providing data stored on the communication device and including said data in the data packet.

4. The method according to claim 1, wherein the data for contacting the SE controlling party comprises a pointer to a remote database containing direct contact details of the SE controlling party.

5. The method according to claim 1, wherein the data packet further comprises information identifying a user of the communication device and the external party.

6. The method according to claim 1, wherein the data packet includes character series identifying the communication device.

7. The method according to claim 1, wherein the data packet includes card production life cycle data for identification of the SE and an associated SE controlling party.

8. The method according to claim 1, wherein the contact data of the SE controlling party is stored in an information network identifier located in the SE, the information network identifier being chosen from a group consisting of URL of a controlling party of the SE and IP address of the controlling party of the SE.

9. The method according to claim 1, wherein the step of creating the data packet by the communication device also includes providing information relating to the requested post issuance operation and including said information in the data packet.

10. The method according to claim 1, wherein sending the data packet is performed using a proximity interface supporting direct data communication between the communication device and the external party.

11. The method according to claim 1, wherein the SE is a software application being part of an operating system of the communication device.

12. The method according to claim 1, wherein a requested operation on the secure element is performed using an interface supporting direct data communication between the communication device and the SE controlling party or the external party.

13. The method according to claim 1, wherein the SE controlling party controls the at least one security domain, and wherein a second SE controlling party controls a second security domain of the SE.

14. The method according to claim 1, wherein the post issuance operation comprises at least one of a creating a new security domain on the SE, loading a new application on the SE, installing a new application on the SE, or activating a new application on the SE.

15. The method according to claim 1, wherein the external party is the same as the SE controlling party.

16. The method according to claim 1 further comprising:
receiving, by the external party or the agent of the external party, from the SE controlling party, an access data packet including the access parameters to perform operations on the security domain.

17. The method according to claim 1 further comprising:
creating, by the external party or the agent of the external party, a post issuance operation request data packet comprising the data suitable for identification of the SE from the first data packet and information relating to the post issuance operation.

18. The method according to claim 1 further comprising:
creating, by the external party or the agent of the external party, a post issuance operation request data packet comprising the data suitable for identification of the SE from the first data packet; and
creating, by the external party or the agent of the external party, a second post issuance operation request data packet comprising information relating to the post issuance operation.

19. A communication device comprising:
a secure element (SE) having at least one security domain and being already personalized, the security domain requiring access parameters to perform at least one operation on the security domain, the SE containing data suitable for the identification of the SE and data for contacting an SE controlling party;
the communication device configured to:
receive a request to enable a post issuance operation on the SE, the post issuance operation comprising an operation performed on the SE after personalization of the SE;
collect from the SE the data suitable for identification of the SE and the data for contacting the SE controlling party, and
create a data packet comprising at least the collected data suitable for identification of the SE and the collected data for contacting the SE controlling party,
and
a transmission hardware device configured to electronically send the data packet via a remote communication channel to an addressee chosen from a group consisting of an external party and an agent of the external party.

20. The communication device according to claim 19, wherein the SE is a software application being part of an operating system of the communication device.

21. The communication device according to claim 19, wherein the data for contacting the SE controlling party comprises a URL or IP address of the SE controlling party.

22. The communication device according to claim 19, wherein the agent of external party is a trusted service manager.

23. The communication device according to claim 19, wherein the communication device is further configured to create the data packet by providing data stored on the communication device and including the data in the data packet.

24. The communication device according to claim 19, wherein the data for contacting the SE controlling party comprises a pointer to a remote database containing direct contact details of the SE controlling party.

25. The communication device according to claim 19, wherein the data packet further comprises information identifying a user of the communication device and the external party.

26. The communication device according to claim 19, wherein the data packet includes character series identifying the communication device.

27. The communication device according to claim 19, wherein the data packet includes card production life cycle data for identification of the SE and an associated SE controlling party.

28. The communication device according to claim 19, wherein the communication device is further configured to create the data packet comprising information relating to the post issuance operation.

29. The communication device according to claim 19, wherein the transmission hardware device further comprises a proximity interface configured to electronically send the data packet via a direct data communication between the communication device and the addressee.

30. The communication device according to claim 19, wherein the post issuance operation is performed on the SE using an interface supporting direct data communication between the communication device and the SE controlling party or the external party.

31. The communication device according to claim 19, wherein the SE controlling party controls the at least one security domain, and wherein a second SE controlling party controls a second security domain of the SE.

32. The communication device according to claim 19, wherein the post issuance operation comprises at least one of a creating a new security domain on the SE, loading a new application on the SE, installing a new application on the SE, or activating a new application on the SE.

33. The communication device according to claim 19, wherein the external party is the same as the SE controlling party.

34. A method for enabling a post issuance operation by an external party on a secure element (SE) controlled by a SE controlling party, the external party comprising a service provider or an agent of the service provider, the post issuance operation comprising an operation performed on the SE after personalization of the SE, the method comprising:
receiving by an external party an initial data packet from a communication device via a remote communication channel, the communication device including a secure element (SE) having been already personalized, the SE having at least one secure domain requiring access parameters to perform at least one operation on the security domain, the communication device including a host program configured to:
collect data from the SE suitable for the identification of the SE and data for contacting an SE controlling party;
create by the communication device the initial data packet containing at least the collected data suitable for the identification of the SE and the collected data for contacting the SE controlling party; and
electronically send the initial data packet to the external party via the remote communication channel;
the method further comprising:
creating a post issuance operation request data packet comprising the data suitable for identification of the SE from the initial data packet; and
sending the post issuance operation request data packet to the SE controlling party at an address defined by the data for contacting the SE controlling party from the initial data packet.

35. The method according to claim 34, wherein the data for contacting the SE controlling party comprises a pointer to a remote database containing direct contact address of the SE controlling party.

36. The method according to claim 34 further comprising:
receiving by the service provider from the SE controlling party an access data packet including the access parameters to perform operations on the security domain.

37. The method according to claim 34, further comprising creating the post issuance operation request data packet comprising the data suitable for identification of the SE from the initial data packet and information relating to a requested post issuance operation.

38. The method according to claim 34, further comprising creating a second post issuance operation request data packet comprising information relating to a requested post issuance operation.

39. The method according to claim 34, wherein the agent of external party is a trusted service manager.

40. The method according to claim 34, wherein the host program is further configured to create the initial data packet also containing data stored on the communication device.

41. The method according to claim 34, wherein the initial data packet further comprises information identifying a user of the communication device and the external party.

42. The method according to claim 34, wherein the initial data packet includes character series identifying the communication device.

43. The method according to claim 34, wherein the initial data packet includes card production life cycle data for identification of the SE and an associated SE controlling party.

44. The method according to claim 34, wherein the data for contacting the SE controlling party comprises a URL or IP address of the SE controlling party.

45. The method according to claim 34, wherein the host program is further configured to create the initial data packet also containing information relating to a post issuance operation.

46. The method according to claim 34, wherein receiving the initial data packed further comprises receiving the initial data packet via a proximity interface supporting direct data communication between the communication device and the external party.

47. The method according to claim 34, wherein the SE is a software application being part of an operating system of the communication device.

48. The method according to claim 34 further comprising performing a post issuance operation on the SE using an interface supporting direct data communication between the communication device and the SE controlling party or the external party.

49. The method according to claim 34, wherein the SE controlling party controls the at least one security domain, and wherein a second SE controlling party controls a second security domain of the SE.

50. The method according to claim 34, wherein the post issuance operation comprises at least one of a creating a new security domain on the SE, loading a new application on the SE, installing a new application on the SE, or activating a new application on the SE.

51. A secure element (SE) comprising:
a security domain requiring access parameters to perform at least one operation on the security domain; and
a determined data group including data suitable for the identification of the SE and data for contacting an SE controlling party, the SE controlling party controlling the SE;
the SE configured to:
provide the data suitable for the identification of the SE and the data for contacting an SE controlling party to a communication device to enable a post issuance operation on the SE after the SE is personalized;
provide the data suitable for the identification of the SE and the data for contacting an SE controlling party, the data suitable for the identification of the SE and the data for contacting an SE controlling party to be sent in a data packet by the communication device to an external party; and
perform a post issuance operation on the SE as instructed by the SE controlling party, the post issuance operation comprising at least one of creating a new security domain for the external party on the SE, loading a new application for the external party on the SE, installing a new application for the external party on the SE, or activating a new application for the external party on the SE.

52. The SE according to claim 51, wherein the data for contacting the SE controlling party comprises a pointer to a remote database containing direct contact details of the SE controlling party.

53. The SE according to claim 51, wherein the data packet further comprises information identifying a user of the communication device and the external party.

54. The SE according to claim 51, wherein the data packet includes character series identifying the communication device.

55. The SE according to claim 51, wherein the data packet includes card production life cycle data for identification of the SE and an associated SE controlling party.

56. The SE according to claim 51, wherein the data for contacting the SE controlling party comprises a URL or IP address of the SE controlling party.

57. The SE according to claim 51, wherein the communication device includes in the data packet information relating to the post issuance operation.

58. The SE according to claim 51, wherein the data suitable for the identification of the SE and the data for contacting an SE controlling party is sent in the data packet by the communication device to an external party using a proximity interface supporting direct data communication between the communication device and the external party.

59. The SE according to claim 51, wherein the SE is a software application being part of an operating system of the communication device.

60. The SE according to claim 51, wherein the post issuance operation is performed on the SE using an interface supporting direct data communication between the communication device and the SE controlling party or the external party.

61. The SE according to claim 51, wherein the SE controlling party controls the security domain, and wherein a second SE controlling party controls a second security domain of the SE.

62. The SE according to claim 51, wherein the external party is the same as the SE controlling party.

* * * * *